United States Patent [19]

Rineer

[11] 4,049,362
[45] Sept. 20, 1977

[54] WIND-DRIVEN ROTOR ASSEMBLY

[76] Inventor: Arthur E. Rineer, P.O. Box 115, Beulah, Mich. 49617

[21] Appl. No.: 698,489

[22] Filed: June 21, 1976

[51] Int. Cl.² .............................................. F03D 3/06
[52] U.S. Cl. .................................. 416/119; 416/132 B
[58] Field of Search ............... 416/132, 132 A, 132 B, 416/111, 119, 110, 117, 118, 240

[56] References Cited

U.S. PATENT DOCUMENTS

| 19,383 | 2/1858 | Shaw | 416/240 X |
| 1,021,560 | 3/1912 | Swift | 416/118 |
| 1,171,584 | 2/1916 | Blakely | 416/44 |
| 1,299,151 | 4/1919 | Ebert | 416/119 X |
| 1,417,000 | 5/1922 | Vogt et al. | 416/132 B |
| 1,644,912 | 10/1927 | Burch | 416/118 |

FOREIGN PATENT DOCUMENTS

| 416,935 | 11/1910 | France | 416/132 |
| 771,804 | 10/1934 | France | 416/119 |
| 4,842 | 8/1908 | United Kingdom | 416/111 |
| 396,368 | 1/1933 | United Kingdom | 416/111 |

Primary Examiner—Everette A. Powell, Jr.
Attorney, Agent, or Firm—Glenn B. Morse

[57] ABSTRACT

A wind-driven rotor for generating power has a central normally vertical column mounted in a base structure for rotation about the column axis. In the preferred form of the invention, a plate is secured to the top of the column perpendicular to the axis of rotation, and functions both as a aerodynamic end plate and as a bracket supporting a group of articulating airfoils. These are rotatable about a pivot connection to the end plate with freedom of movement within a limited sector of articulation providing driving and feathering airfoil positions. The airfoils are preferably triangular, with an apex downward, and pivotally connected to a member fixed with respect to the column at a position relatively close to the column axis, so that one side of the triangular configuration approaches parallelism with the column.

1 Claim, 10 Drawing Figures

U.S. Patent  Sept. 20, 1977  4,049,362
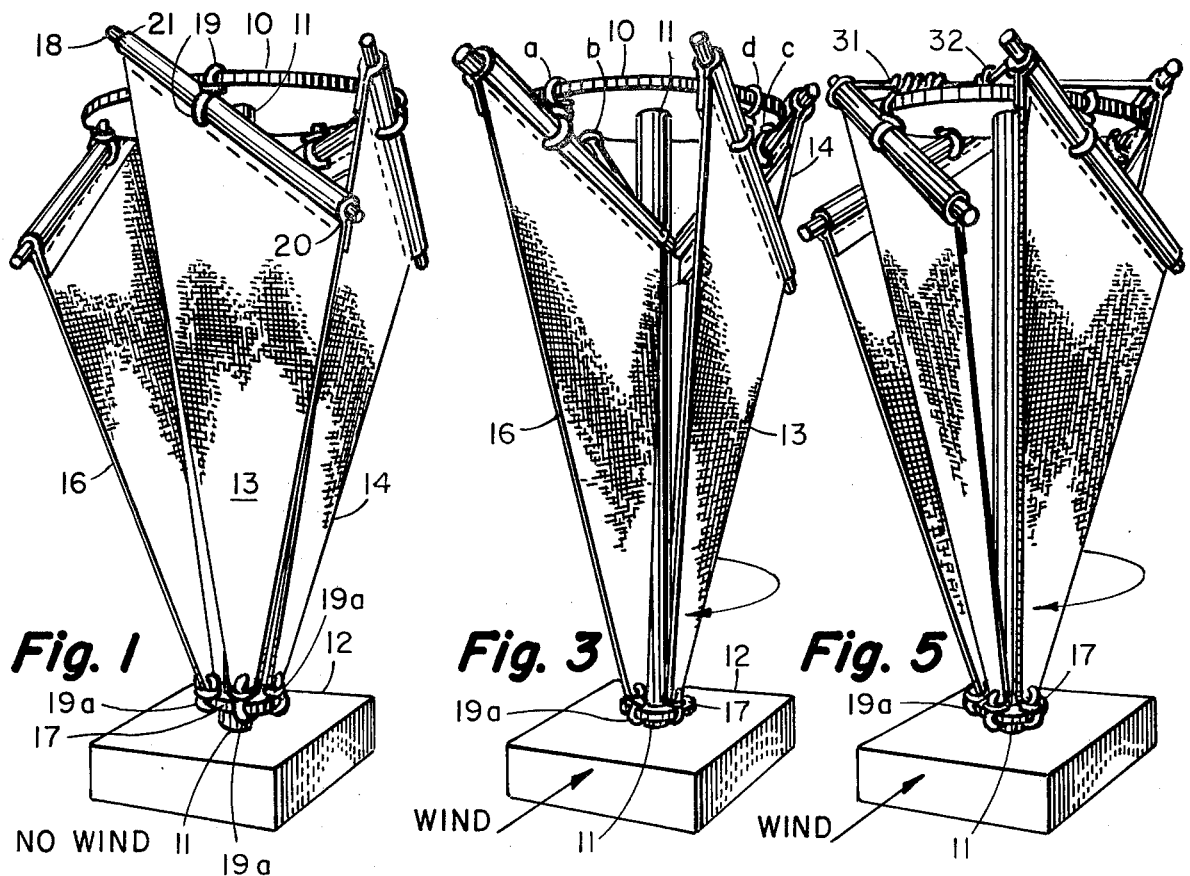

WIND-DRIVEN ROTOR ASSEMBLY

BACKGROUND OF THE INVENTION

Devices for utilizing wind energy to generate power tend to be of either of two types. The first of these is the usual wind mill configuration, which may be referred to with somewhat greater dignity as a wind-turbine. These devices must necessarily have an axis of rotation in fairly close alignment with the wind direction in order to produce power. The other type of device utilizes a rotor mounted for rotation on an axis transverse to the wind direction, and which may be either horizontal or vertical. The vertical type has the great advantage of responding to wind from any direction without requiring a shifting of its mounting. The present invention is associated with a form of this type of device in which the wind impinges on the surfaces of articulating airfoils that change position in cycles as the rotor assembly revolves. Machines operating on these principles have been known for many years, and typical examples have been noted in the following U.S. patents:

| PATENT NUMBER: | INVENTOR: | DATE OF ISSUE: |
| --- | --- | --- |
| 598,479 | Hoover | 1898 |
| 3,604,942 | Nelson | 1971 |
| 3,743,848 | Strickland | 1973 |

The use of triangular sail-type panels as articulating airfoils is disclosed in the Monney U.S. Pat. No. 2,633,921, which provides for a pivotal relationship between the sail panels at an apex of the triangular configuration, and also at the side opposite from the apex by providing what amounts to a pivotal connection of a boom to a supporting structure. The Monney patent, however, is associated with a horizontal-axis rotor functioning in the manner of a wind mill, with the sail articulation being used solely to control the angle of attack of the sails with respect to a constant wind direction. A biasing effect is also shown in this patent, which is also limited to the decrease of the angle of attack in response to wind pressure.

The primary design criteria of the present invention is the improvement of the power-cost ratio through the use of maximum simplicity and readily-available inexpensive materials. To eliminate the need for incorporating governing devices, it is very desirable that a rotor assembly should have inherent speed-limiting characteristics to eliminate possible damage to the rotor and to the associated power-generating equipment during periods of excessive wind velocity.

SUMMARY OF THE INVENTION

A vertical-axis rotor has a central column supporting a transverse member preferably at the top of the column. For most efficient operation, this member is a plate mounted perpendicular to the axis of revolution to perform the aerodynamic function of an end plate, and also support the articulating airfoil panels. These panels are preferably triangular in configuration, with the apex pointing downward and pivotally secured to a member fixed with respect to the column at a position relatively close to the axis of rotation. The panels are preferably of fabric, with the upper end of the triangular configuration terminating in a boom pivotally connected to the end plate at an intermediate point on the boom, with the boom capable of swinging into abutting relationship with the column on rotation of the boom about its own axis of pivotal connection. The disposition of the boom with respect to the horizontal is such that it angles upwardly from the end adapted to contact the column, so that the opposite end can engage either the edge of the end plate or an auxiliary stop secured to it. The column and the end plate thus establish a limited sector of freedom of articulation of the sail-type airfoils as the entire rotor revolves. A modified form of the invention provides a biasing action extending between diametrically opposite ends of the airfoil panels to provide a snap-action to the articulation, and control the position at which a feathering action takes place.

DESCRIPTION OF THE DRAWINGS

FIG. 1 is a perspective view of the rotor assembly in the no-wind condition.

FIG. 2 is a top view with respect to FIG. 1.

FIG. 3 is a perspective view of the operating condition of the rotor assembly.

FIG. 4 is a top view with respect to FIG. 3.

FIG. 5 is a perspective view of a modified form of the invention.

FIG. 6 is a top view with respect to FIG. 5.

FIG. 7 is a schematic view of the power transfer system.

FIG. 8 is a perspective view of an airfoil panel.

FIG.9 is a perspective view of a modified airfoil panel.

FIG. 10 is a schematic view of a multiple form of the invention.

DESCRIPTION OF THE PREFERRED EMBODIMENTS

The power generator shown in FIG. 1 is based upon a rotor which includes the end plate 10 mounted at the upper extremity of the column 11. The column is rotatably mounted in suitable bearings (not shown) in the box-like base structure 12 containing a standard mechanism for conversion of the rotative torque from the column to usable power. A group of triangular airfoil panels 13 –16 extends between points of pivotal connection to the end plate 10 and the member 17 secured to the column 11 adjacent the base structure 12. Preferably, the airfoil panels are of a fabric or fabric-like material, with the upper end of the triangular configuration terminating in a boom as shown at 18 in FIG. 1. The upper pivotal connection is then provided by a flexible cord as shown at 19 engaging the end plate 10 and the boom 18 at an intermediate point on the boom. The apex forming the lower end of the triangular configuration may similarly be connected to the member 17 by a flexible cord 19a, as shown in FIG. 8. This type of construction provides the sort of simplicity that makes the unit usable in remote areas, as repairs can be made with materials that are readily available.

The distance between the cord 19 and the ends 20 and 21 of the airfoil panels is such that the articulating rotation of the panels will swing the booms (and the associated edges of the airfoil panels) into engagement with the column, so that the column functions as a stop determining one extremity of the sector of freedom of angular articulation. The opposite extremity to this freedom of movement is provided by the upward inclination from the inner end 20 to the opposite extremity of the boom 18 indicated at 21. This upward inclination is sufficient to cause the end 21 to swing into engagement with the edge of the plate 10 to function as the opposite limit stop. It should be noted that the engagement of the lower end 20, as it swings against the column 11, will bring the entire edge of the airfoil panels into what amounts to sealing engagement with the column during one phase of the rotary movement of the entire assembly.

FIG. 3 illustrates the articulation of the airfoil panels as the rotor revolves, providing differential forces on opposite sides which generate the torque necessary to provide usable power. In the position illustrated at a, the wind pressure acting against the airfoil panels will induce a counter clockwise rotation of the panels about their pivotal connections so that they swing in against the column. This condition persists through the position shown at b around to approximately the point indicated at c. At this point, the combination of centrifugal force, the action of gravity, and the changes in the direction of wind pressure cause the airfoil panels to rotate clockwise, about their own axes of pivotal connection, to the opposite extremity of their freedom of articulation determined by the engagement of the end 21 of the booms with the edge of the end plate 10. This condition, however, is momentary. By the time the panels reach the position indicated at d, a degree of feathering action takes place resulting from wind pressure, which causes the panels to remain in an intermediate position between the extremes of articulation. The point of pivotal mounting of the booms is therefore selected with careful regard to the center of the area of the airfoil panels to assure that the center of pressure is behind (with respect to the direction of rotation of the rotor) a line connecting the points of pivotal mounting of the airfoil panels. Normally, this can be provided by establishing the pivot connection to the boom at a point between one-quarter and one-third of the boom length from the end 18.

The modification shown in FIGS. 5 and 6 provides a somewhat different articulation pattern as a result of the resilient diametrical cross-connection of the upper leading ends of the airfoil panels shown at 31 and 32. The intensity of the biasing action provided by these cross-connections should be light enough so as to avoid completely blocking the feathering tendency during the up-wind phase of rotation of the airfoil panels. In this modification, the panels do not swing inward into engagement with the column. In contrast to the arrangement shown in FIG. 4, the longer ends of the booms are thus permitted to swing outward to a position providing a greater engagement with the wind than that on the opposite side of the rotor, where a limited feathering action takes place. A rotational speed of the FIG. 6 configuration is greater than that characteristic of FIG. 4, but the torque is typically somewhat less. The rotational speed of FIG. 4 is very largely self-limiting, as a result of the time factor involved in the considerable angular articulation of the airfoil panels. Since this is present to a much less degree in the FIG. 6 arrangement, the rotational speed of the biased form of the assembly will tend to increase to a much greater degree in response to an increase in wind velocity. The increase in torque of the FIG. 4 arrangement is largely attributable to the lateral deflection of the wind from left to right, as viewed in FIG. 4, from the panels in the a position. This deflection tends to swing the opposite panels on the up-wind side into a position where, for a short period, they tack up-wind like a sail boat.

The torque generated by either form of the rotor assembly is transferred directly to the shaft 22 secured to the column 11 (Refer to FIG. 7). The sprocket 23 is fixed with respect to the shaft 22, and drives the chain 24 an engagement with the driven sprockets 25-27. These sprockets, mounted on appropriate shafts, are preferably associated with a water pump, a generator or alternator, and an air pump. These are preferably associated with standard selective clutch mechanisms (not shown) so that either one of these three units may be engaged selectively by manual or automatic controls. The base structure 12 thus becomes a package assembly that can be deposited in any location where power in any of these forms is needed. Increases in power requirements beyond the capability of a single rotor assembly may be provided by the stacked arrangement shown in FIG. 8. The upper extremities of the column 11 can receive an appropriate portion of the lower extremities of a similar column of the unit directly above, so that the rotors 28-30 are interconnected and coaxial. This arrangement preserves the rotational speed characteristic of a single rotor. Enlargement of the scale of the individual rotors has a strong effect on the rotational speed, as the articulating masses become progressively more significant. Wherever it may be desirable to do so, the fabric material of the preferred form of the airfoil panels can be replaced by more solid sheet-type materials, with the pivot connections provided by stub shaft extensions 33 and 34 engaging appropriate bearings in the end plate 10 and in the member 17, as shown in FIG. 9.

I claim:

1. A wind-driven power generator having a normally vertical column mounted in a base structure for rotation about the axis of said column, and including a plurality of articulating airfoils each secured at the upper extremity thereof to a transverse plate fixed with respect to said column, said generator also including means operative to convert rotative torque from said column to usable power, wherein the improvement comprises:

a triangular panel constituting each of said airfoils, one corner of said panel being pivotally connected to a lower portion of said column, the edge of said panel opposite from said corner being pivotally connected to said transverse plate, said panel edge being disposed at an annular relationship with respect to a line connecting said corner and edge pivotal connection such that said edge engages said plate on rotation of said panel with respect to said plate in one direction, and said edge extends to engage said column on rotation of said panel with respect to said plate in the opposite direction to establish a limited sector of freedom of movement of said panel.

* * * * *